(12) United States Patent
Oshidari et al.

(10) Patent No.: US 7,259,493 B2
(45) Date of Patent: Aug. 21, 2007

(54) STATOR OF TWO ROTOR SINGLE STATOR TYPE ELECTRIC MOTOR

(75) Inventors: Toshikazu Oshidari, Kanagawa (JP); Masaki Nakano, Yokohama (JP); Minoru Arimitsu, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 10/815,865

(22) Filed: Apr. 2, 2004

(65) Prior Publication Data
US 2004/0195929 A1    Oct. 7, 2004

(30) Foreign Application Priority Data
Apr. 4, 2003    (JP) .............................. 2003-101339

(51) Int. Cl.
H02K 1/12    (2006.01)
H02K 16/02    (2006.01)
(52) U.S. Cl. .................... 310/216; 310/114; 310/217; 310/254; 310/266; 180/65.6
(58) Field of Classification Search ........ 310/216–217, 310/254, 259, 266
See application file for complete search history.

(56) References Cited

U.S. PATENT DOCUMENTS

| | | | | |
|---|---|---|---|---|
| 2,323,114 A | * | 6/1943 | Werner et al. | 310/218 |
| 2,871,384 A | * | 1/1959 | Gabriel | 310/258 |
| 3,469,136 A | * | 9/1969 | Jenkinson | 310/216 |
| 3,671,787 A | * | 6/1972 | Herron | 310/154.11 |
| 5,208,498 A | * | 5/1993 | Hamajima | 310/12 |
| 5,420,471 A | * | 5/1995 | Yun | 310/216 |
| 5,793,136 A | * | 8/1998 | Redzic | 310/114 |
| 5,799,387 A | * | 9/1998 | Neuenschwander et al. | 29/598 |
| 6,043,583 A | * | 3/2000 | Kurosawa et al. | 310/254 |
| 6,064,132 A | * | 5/2000 | Nose | 310/216 |
| 6,114,784 A | * | 9/2000 | Nakano | 310/59 |
| 6,191,510 B1 | * | 2/2001 | Landin et al. | 310/51 |
| 6,225,725 B1 | * | 5/2001 | Itoh et al. | 310/254 |
| 6,448,685 B1 | * | 9/2002 | Mayer et al. | 310/254 |
| 6,472,788 B1 | | 10/2002 | Nakano | |
| 6,477,761 B1 | | 11/2002 | Ohashi et al. | |
| 6,732,526 B2 | * | 5/2004 | Minagawa et al. | 60/706 |

FOREIGN PATENT DOCUMENTS

EP    1091475 A2 *    4/2001

(Continued)

*Primary Examiner*—Burton Mullins
(74) *Attorney, Agent, or Firm*—Foley & Lardner LLP

(57) ABSTRACT

A stator for a two rotor single stator type electric motor is described. The electric motor has inner and outer rotors that are rotated independently within and around a stator upon application of current to the stator. The stator comprises a stator core including a plurality of stator teeth that are circumferentially arranged around a common axis. Each stator tooth includes a plurality of flat magnetic steel plates that are aligned along the common axis while intimately and closely contacting to one another. The stator further comprises at least one connecting ring plate that is coaxially installed in the stator core in such a manner that the ring plate is intimately put between adjacent two of the flat magnetic steel plates of each stator tooth. The ring plate is of an endless annular member.

21 Claims, 10 Drawing Sheets

FOREIGN PATENT DOCUMENTS

| JP | 6-105488 A | | 4/1994 |
|---|---|---|---|
| JP | 11-341757 A | | 12/1999 |
| JP | 11-346446 A | * | 12/1999 |
| JP | 2000-14086 A | | 1/2000 |
| JP | 2001-112221 A | * | 4/2001 |
| JP | 2001-128423 A | | 5/2001 |

* cited by examiner

FIG.9A FIG.9B
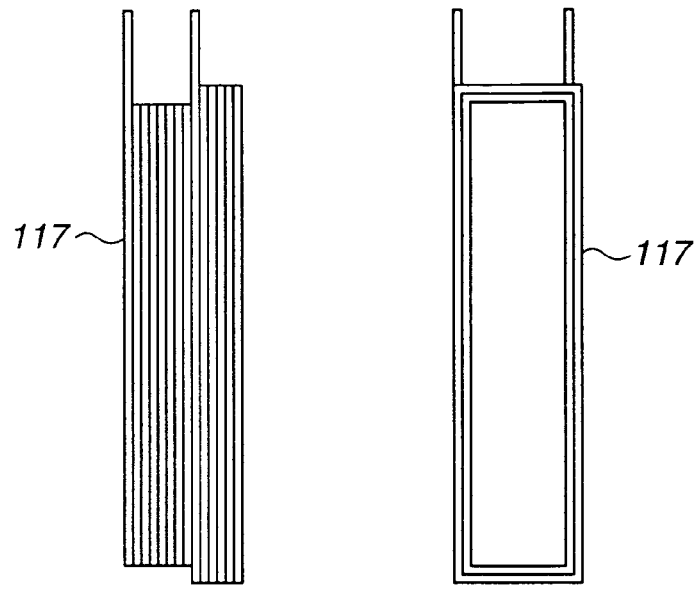
FIG.10
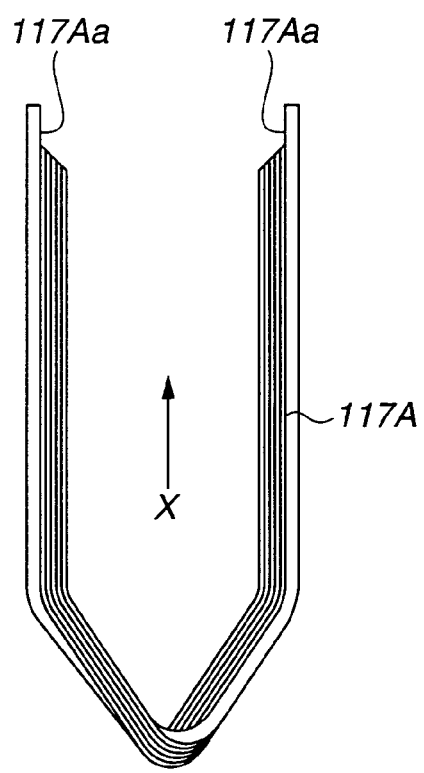

ic motors,
STATOR OF TWO ROTOR SINGLE STATOR TYPE ELECTRIC MOTOR

BACKGROUND OF INVENTION

1. Field of Invention

The present invention relates in general to electric motors, and more particularly to electric motors of a two rotor single stator type which comprises outer and inner rotors which rotate around and within a common stator. More specifically, the present invention is concerned with a stator for the two rotor single stator type electric motor.

2. Description of Related Art

One electric motor of the above-mentioned type is shown in Japanese Laid-open Patent Application (Tokkai) 2000-14086. In the electric motor of this published application, upon feeding a compound electric current to a common stator, two rotors, that is, inner and outer rotors are rotated relatively around and within the common stator. By controlling the compound electric current fed to the stator, rotation of the inner rotor and that of the outer rotor are individually controlled.

Usually, the stator used for such two rotor type motor is of a cantilever type wherein a torque produced by each rotor is received by only one axial end of the stator that is secured to a case that constitutes a structural base. Thus, under operation of the motor, the torque produced by each rotor causes generation of a certain torsional stress applied to the stator in a direction to induce a deformation of the same. Thus, if the stress is great, the stator is subjected to a deformation.

FIGS. 11A and 11B of the accompanying drawings schematically show the stator 301 that is disclosed by the published application. That is, as is seen from FIG. 11A, the stator 301 comprises a stator core that includes a plurality of stator teeth SP that are circumferentially arranged around a common axis of the motor at evenly spaced intervals. Each stator tooth SP has a rectangular parallelepiped shape and includes a plurality of pressed flat magnetic steel plates that are closely aligned along the common axis intimately and closely contacting to one another. Thus, upon assembly, the stator core has a waterwheel shape that has a plurality of stator teeth SP circumferentially arranged about the common axis. Each stator tooth SP has a coil that is put therearound making round-trips in a direction parallel with the common axis. The stator core thus assembled is sandwiched between two axially spaced supporting brackets 303A and 303B and tightened by a plurality of bolts 304 and nuts 305. Although not well shown in the drawings, finally, two supporting brackets 303A and 303B, bolts 304 and nuts 305 are all embedded in a molded plastic to constitute the cylindrical stator 301.

As is seen from FIG. 11B, under rotation of the outer and inner rotors, a certain torque is inevitably applied to the stator 301 in a direction to induce a deformation or inclination of the stator teeth SP for the reason as is mentioned hereinabove.

SUMMARY OF THE INVENTION

As is understood from the above description and FIG. 11B, in order to provide the stator teeth SP with a satisfied rigidity against the torque for suppression of the deformation or inclination, it is necessary to tightly couple the two supporting brackets 303A and 303B by strongly engaging bolts 304 and nuts 305. As is known to those skilled in the art, strong engagement between bolts 304 and nuts 305 needs increase in a mechanical strength of each bolt 304 and nut 305, that is, increase of the size of each bolt 304 and nut 305. However, in this case, the volumetric ratio of bolts 304 and nuts 305 relative to the entire construction of the stator 301 is remarkably increased which lowers the electromagnetic characteristic of stator 301.

It is therefore an object of the present invention to provide a stator for use in a two rotor single stator type electric motor, which is free of the above-mentioned drawbacks.

In accordance with a first aspect of the present invention, there is provided a stator for use in a two rotor single stator type electric motor in which inner and outer rotors are rotated independently within and around the stator upon application of current to the stator, the stator comprising a stator core including a plurality of stator teeth that are circumferentially arranged around a common axis, each stator tooth including a plurality of flat magnetic steel plates that are aligned along the common axis while intimately and closely contacting to one another; and at least one connecting ring plate coaxially installed in the stator core in such a manner that the ring plate is intimately put between adjacent two of the flat magnetic steel plates of each stator tooth, the ring plate being of an endless annular member.

In accordance with a second aspect of the present invention, there is provided a stator for use in a two rotor single stator type electric motor in which inner and outer rotors are rotated independently within and around the stator upon application of a compound electric current to the stator, the stator comprising a stator core including a plurality of stator teeth that are circumferentially arranged around a common axis, each stator tooth including a plurality of flat magnetic steel plates that are aligned along the common axis while intimately and closely contacting to one another; at least one connecting ring plate coaxially installed in the stator core in such a manner that the ring plate is intimately put between adjacent two of the flat magnetic steel plates of each stator tooth, the ring plate being of an endless annular member; a plurality of coils put around the stator teeth respectively; two supporting brackets between which the stator teeth of the stator core are sandwiched; fastening members that fasten the two supporting brackets to tightly and intimately connect the magnetic steel plates of each stator tooth to one another; and a molded plastic that embeds therein the stator core, the connecting ring plate, the coils, the two supporting brackets and the fastening members thereby to constitute a cylindrical structure.

BRIEF DESCRIPTION OF THE DRAWINGS

FIGS. 9A and 9B are front and side views of a coil that has been previously shaped for being used in the stator of the invention;

FIG. 10 is a front view of another coil that has been previously shaped for being used in the stator of the invention.

DETAILED DESCRIPTION OF THE INVENTION

In the following, the present invention will be described in detail with reference to the accompanying drawings.

For ease of understanding, various directional terms such as right, left, upper, lower, rightward and the like are used in the following description. However, such terms are to be understood with respect to only a drawing or drawings on which the corresponding part or portion is shown.

Figure 1:
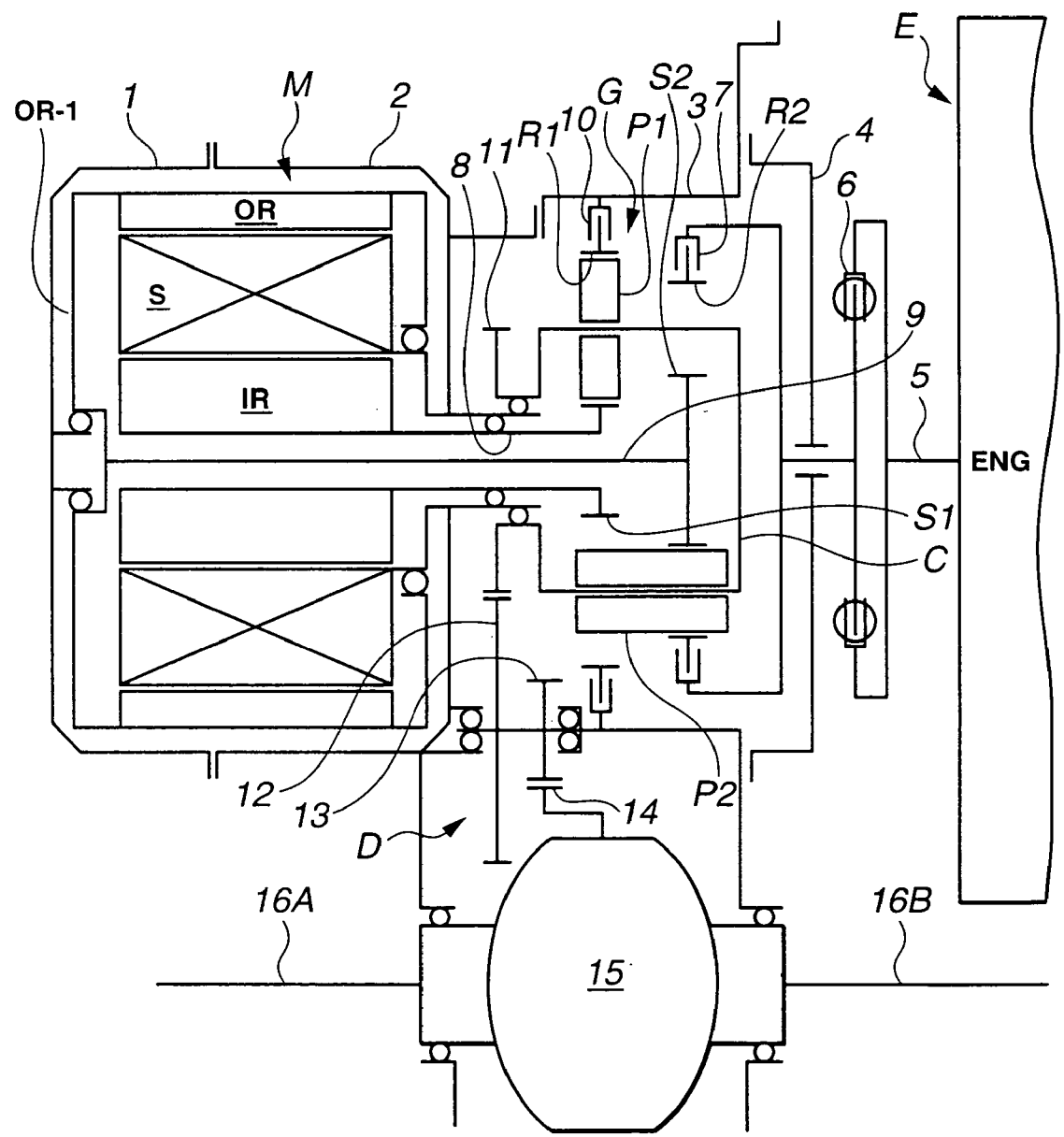
FIG. 1 is a schematic view of a hybrid type drive unit for a wheeled motor vehicle, to which a two rotor single stator type electric motor is applied.

In FIG. 1, there is shown a hybrid type drive unit HTDU for a wheeled motor vehicle, to which a two rotor single stator type electric motor is practically applied.

The hybrid type drive unit HTDU comprises generally an engine (viz., internal combustion engine or the like) E, a two rotor single stator type electric motor M, a ravigneawx complex type planetary gear unit G and a drive output mechanism D. As shown, the electric motor M is covered by both a motor cover 1 and a motor case 2, and the planetary gear unit G is installed in a gear housing 3, and an open right end of the gear housing 3 is covered by a front cover 4.

Engine E is a prime mover of the drive unit HTDU, which has an output shaft 5 that is connectable to a second ring gear R2 of the planetary gear unit G through a rotation fluctuation absorbing damper 6 and a multiple disc clutch 7, as shown.

Electric motor M is an auxiliary mover of the drive unit HTDU, which has two motor generator functions, although having an appearance as one motor. Electric motor M comprises a stator S that is fixed to motor case 2 and has a plurality of coils disposed thereon, an inner rotor IR that is rotatably arranged in stator S and has a plurality of permanent magnets disposed thereon, an outer rotor OR that is rotatably arranged around stator S and has a plurality of permanent magnets disposed thereon. As shown, stator S, inner rotor IR and outer rotor OR are concentrically arranged to constitute a triple-layer cylindrical construction.

A first shaft 8 that is hollow is coaxially connected to inner rotor IR to rotate therewith. This hollow first shaft 8 axially extends rightward to connect to a first sun gear S1 of planetary gear unit G. A second shaft 9 is connected through a torque transmission plate OR-1 to outer rotor OR to rotate therewith. This second shaft 9 extends rightward in the hollow first shaft 8 to connect to a second sun gear S2 of planetary gear unit G, a shown.

Ravigneawx complex type planetary gear unit G is a continuously variable transmission mechanism that can continuously vary a gear ratio by receiving controlled rotations of inner and outer rotors IR and OR of the electric motor M.

That is, the planetary gear unit G comprises five rotating major elements, which are a common carrier C that carries mutually meshed first and second pinions P1 and P2, the above-mentioned first sun gear S1 that is meshed with first pinions P1, the above-mentioned second sun gear S2 that is meshed with second pinions P2, a first ring gear R1 that is meshed with first pinions P1, and a second ring gear R2 that is meshed with second pinions P2. Between first ring gear R1 and gear housing 3, there is arranged a multi disc brake 10, and to the common carrier C, there is connected an output gear 11.

Drive output mechanism D comprises the above-mentioned output gear 11, a first counter gear 12 that is meshed with output gear 11, a second counter gear 13 that is integral with first counter gear 12, a drive gear 14 that is meshed with second counter gear 13, a differential gear 15 that is meshed with drive gear 14 and drive shafts 16A and 16B that extend leftward and rightward from differential gear 15 respectively. Thus, a torque led to output gear 11 from planetary gear unit G is led through first counter gear 12, second counter gear 13, drive gear 14 and differential gear 15 to the left and right drive shafts 16A and 16B thereby to move an associated motor vehicle through drive road wheels (not shown).

That is, in the hybrid type drive unit HTDU, second ring gear R2 is connected to output shaft 5 of the engine E, first sun gear S1 is connected to first shaft 8 of the electric motor M, second sun gear S2 is connected to second shaft 9 of the electric motor M, and common carrier C is connected to output gear 11.

Figure 2:
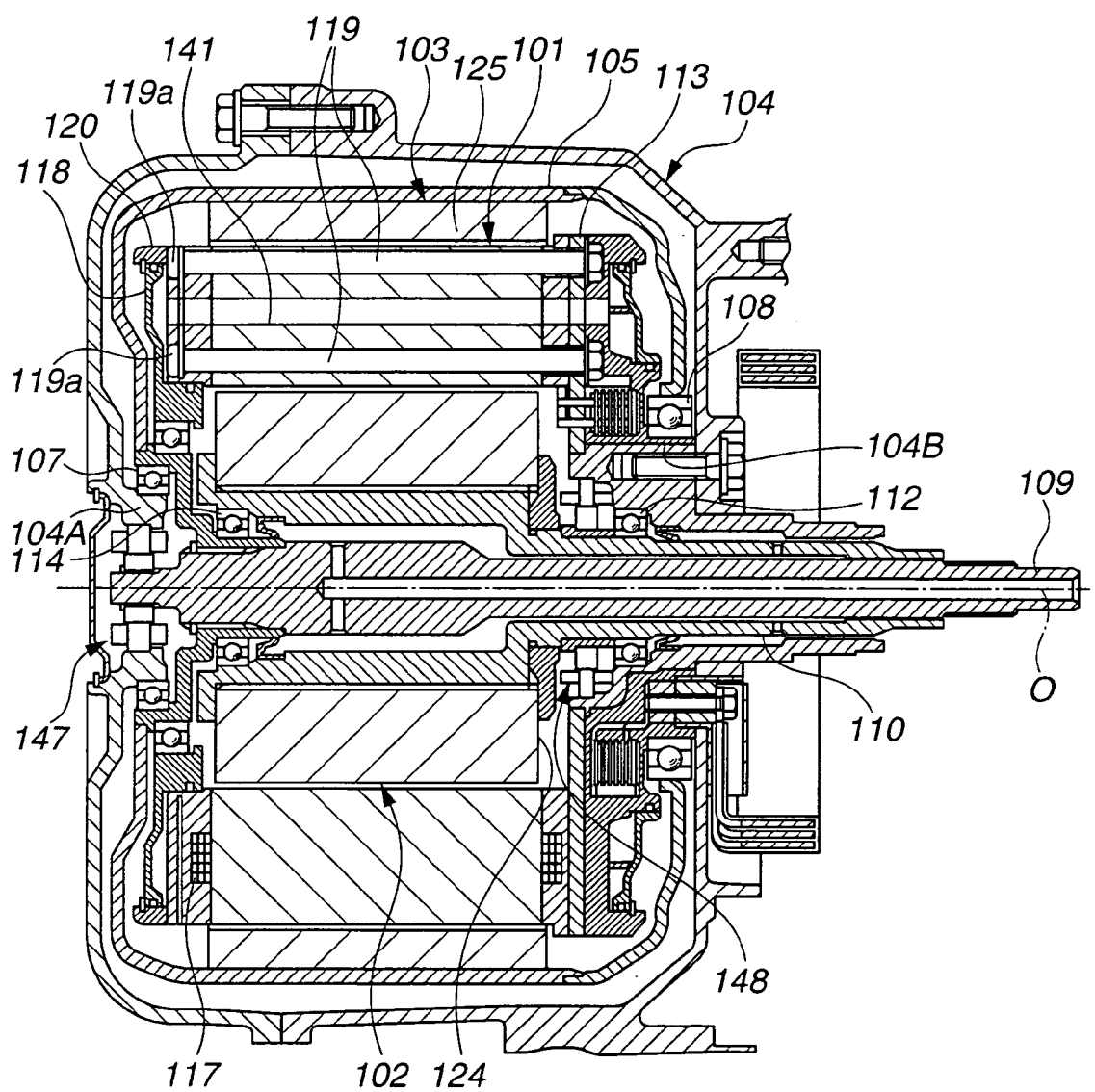
FIG. 2 is a sectional view of a two rotor single stator type electric motor to which a stator of the present invention is practically applied.

Referring to FIG. 2, there is shown in a sectional fashion the two rotor single stator type electric motor M. As will be described in detail hereinafter, a stator according to the present invention is applicable to such electric motor M.

As is seen from FIG. 2, the electric motor M comprises an annular stator 101, an inner rotor 102 that is rotatably arranged in annular stator 101 and an outer rotor 103 that is rotatably arranged around annular stator 101. As shown, these three elements 101, 102 and 103 are concentrically arranged and installed in a housing 104.

Inner rotor 102 comprises a laminated core 124 that has a plurality of pressed out flat magnetic steel plates aligned along a common axis O of electric motor M, and a plurality of permanent magnets that are embedded in and around the laminated core 124 at evenly spaced intervals. Each permanent magnet extends in parallel with the common axis O.

Similar to inner rotor 102, outer rotor 103 comprises a laminated core 125 that has a plurality of pressed out flat magnetic steel plates aligned along the common axis O, and a plurality of permanent magnets that are embedded in and around the laminated core 125 at evenly spaced intervals. Each permanent magnet extends in parallel with the common axis O.

Inner and outer rotors 102 and 103 have different pole pieces so that these rotors 102 and 103 have different pole pairs. In one example, inner and outer rotors 102 and 103 have each twelve permanent magnets. In this case, since inner rotor 102 is constructed to constitute one pole by two permanent magnets, the number of the pole pairs of inner rotor 102 is 3, and since outer rotor 103 is constructed to constitute one pole by one permanent magnet, the number of pole pairs of outer rotor 103 is six.

As is shown in FIG. 2, laminated core 125 of outer rotor 103 is secured at its outer surface to an inner surface of a torque transmitting shell 105 so that outer rotor 103 and torque transmitting shell 105 rotate together like a single unit. Axial ends of torque transmitting shell 105 are rotatably held on axially spaced cylindrical portions 104A and 104B of housing 104 through respective bearings 107 and 108.

As shown, torque transmitting shell 105 has a left center portion connected to a left end of an outer rotor shaft 109, so that torque transmitting shell 105 and outer rotor shaft 109 rotate together like a single unit.

As shown in FIG. 2, laminated core 124 of inner rotor 102 has a center bore in and through which a hollow inner rotor shaft 110 axially passes. The above-mentioned outer rotor shaft 109 is rotatably received in hollow inner rotor shaft 110.

As shown, laminated core 124 of inner rotor 102 is connected to inner rotor shaft 110 to rotate therewith like a single unit. A center portion of inner rotor shaft 110 is rotatably mounted through a bearing 112 on a fixed stator bracket 113 that holds a right end of stator 101. A left end portion of inner rotor shaft 110 is rotatably disposed through a bearing 114 on a left end center portion of torque transmitting shell 105 of outer rotor 103.

Figure 3:
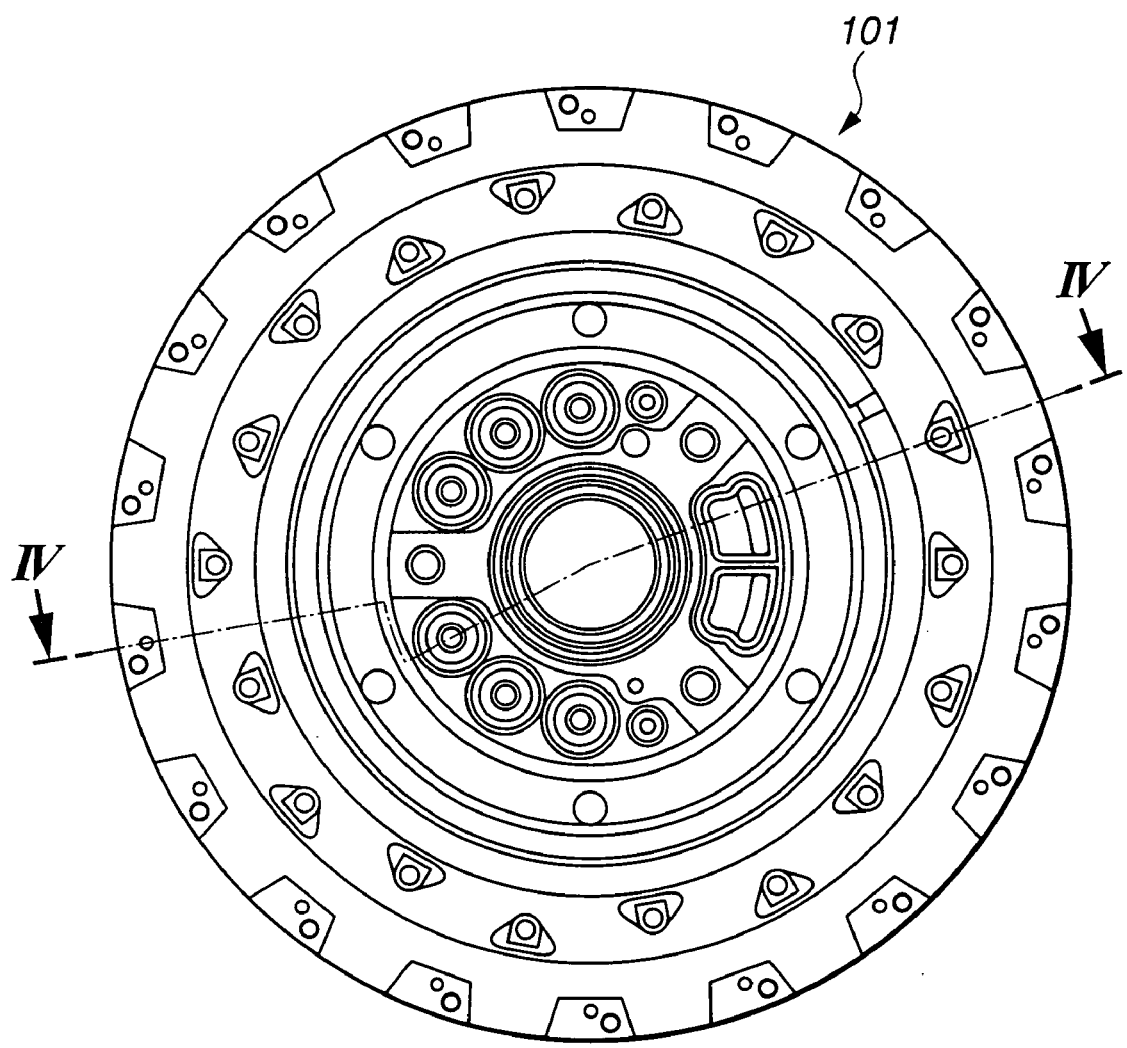
FIG. 3 is a front view of the stator of the present invention.
Figure 4:
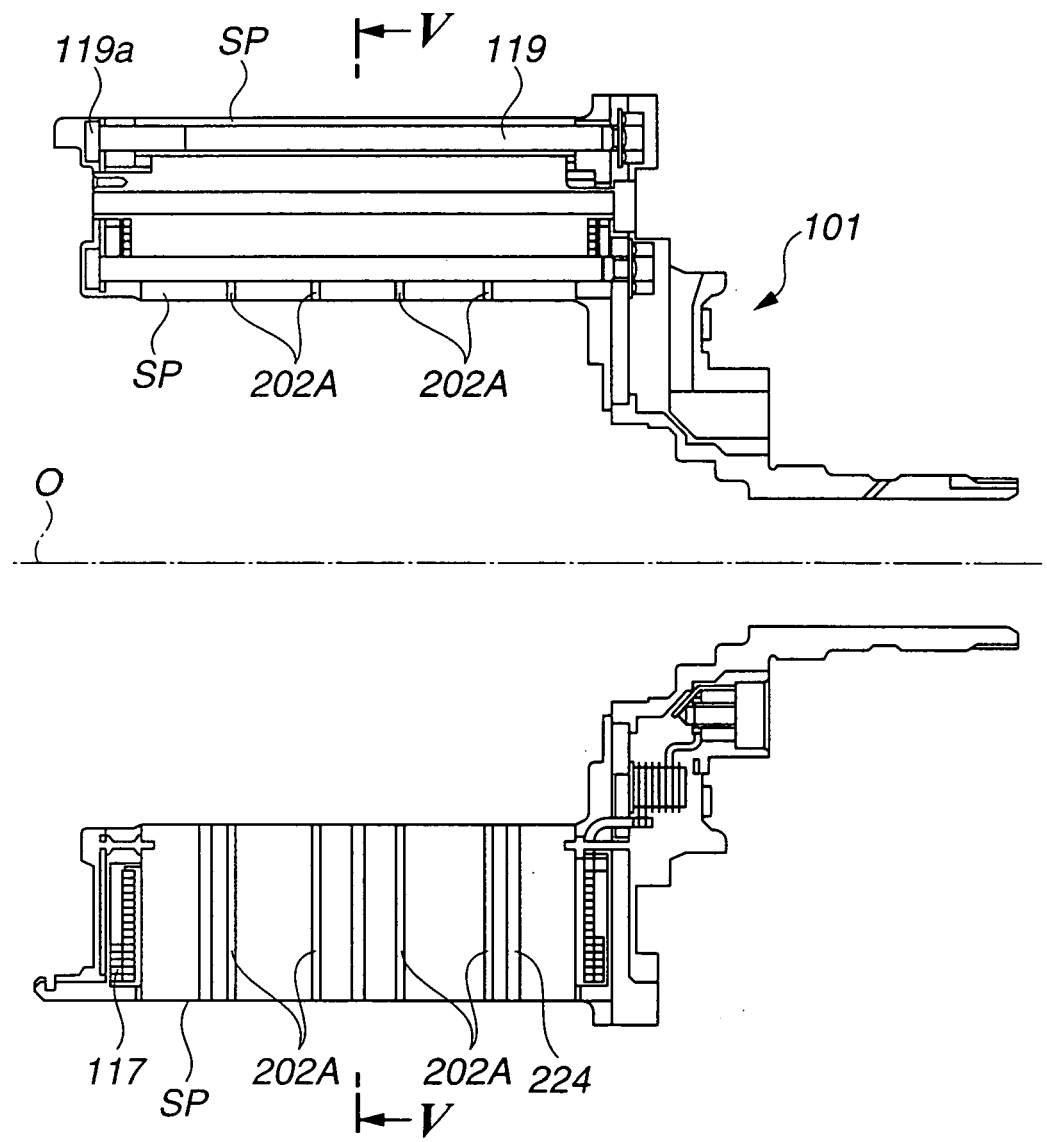
FIG. 4 is a sectional view taken along the line IV-IV of FIG. 3.
Figure 5:
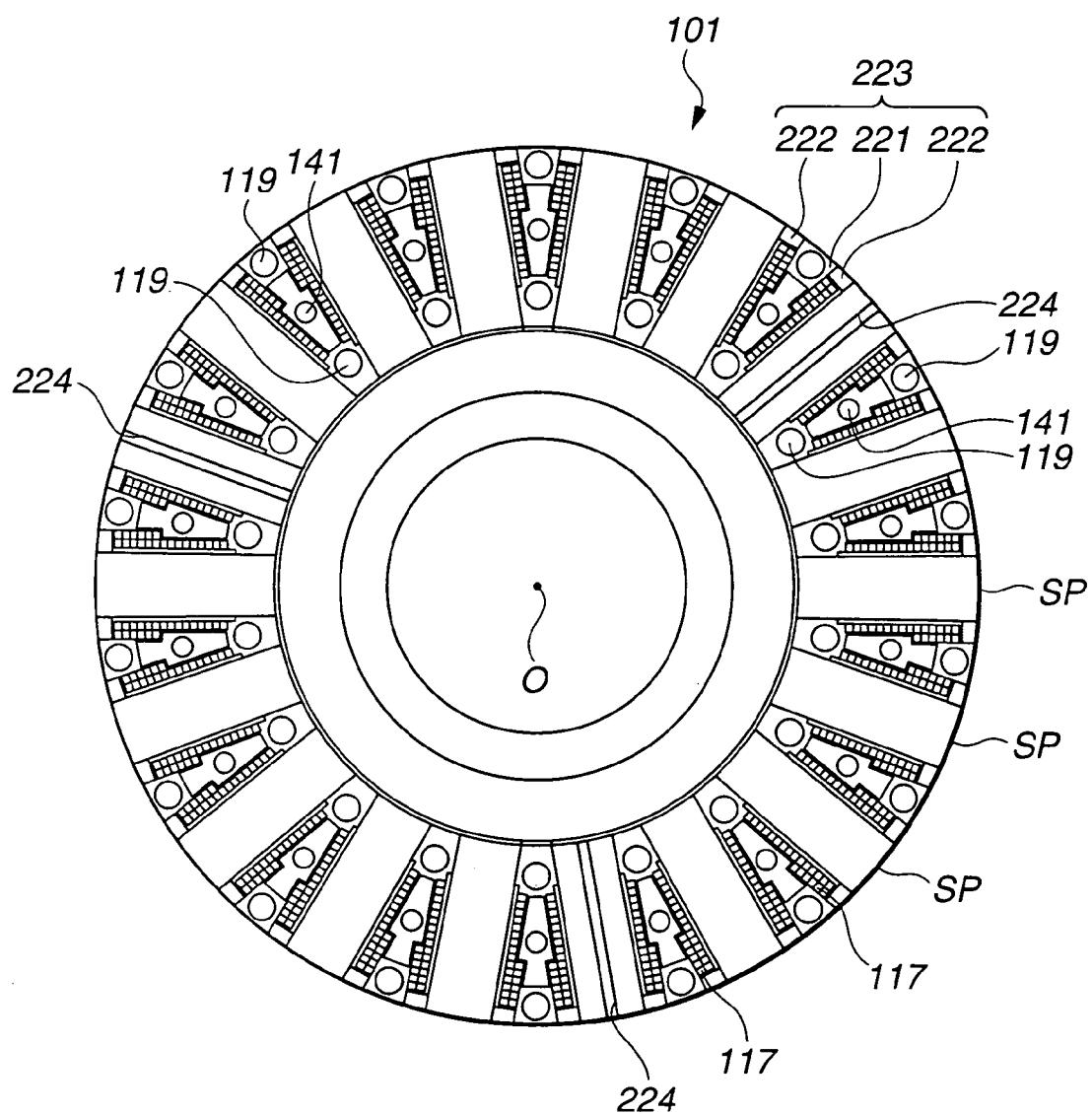
FIG. 5 is a sectional view taken along the line V-V of FIG. 4.

As is seen from FIGS. 3, 4 and 5, especially FIG. 5, stator 101 comprises a stator core that includes a plurality (eighteen in the illustrated embodiment) of stator teeth SP that are circumferentially arranged around common axis O of motor M at evenly spaced intervals. Each stator tooth SP has a rectangular parallelepiped shape and includes a plurality of pressed flat magnetic steel plates that are closely aligned along the common axis O intimately contacting to one another. As is seen from the drawing, each magnetic steel plate has a generally I-shaped cross section.

Thus, as is understood from FIG. 5, upon assembly, the stator core has a waterwheel shape that has a plurality of teeth or stator teeth SP circumferentially arranged about common axis O.

As is understood from FIGS. 4 and 5, each stator tooth SP has a coil 117 that is put therearound making round-trips in a direction parallel with common axis O.

As is seen from FIG. 2, the stator core thus assembled in the above-mentioned manner is sandwiched between the axially spaced two supporting brackets 113 and 118 and tightened by a plurality of bolts 119 and nuts 119a.

It is to be noted that the stator core, two supporting brackets 113 and 118, bolts 119 and nuts 119a are all embedded in a molded plastic 120 to constitute the cylindrical stator 101.

As is seen from FIGS. 2 and 5, the molded plastic 120 has a plurality of coolant jackets 141 each extending axially in parallel with common axis O between and along adjacent bolts 119, and the bolts 119 extend axially at radially inner and outer portions of the molded plastic 120 with respect to the corresponding coolant jacket 141.

As is understood from FIG. 2, each bolt 119 has a threaded left end to which a nut 119a is connected. Thus, when nuts 119a are turned in a fastening direction, the stator teeth of the stator core are tightly and closely fastened to one another. If desired, in place of the bolts and nuts, rivet pins may be used for fastening the stator teeth.

As is seen from FIG. 5, three of the eighteen stator teeth SP are provided with oil passages 224 each communicating an air gap defined between stator 101 and inner rotor IR and an air gap defined between stator 101 and outer rotor OR. With these oil passages 224, stator 101 can be effectively cooled.

As is seen from FIG. 2, first and second speed sensors 147 and 148 are arranged in the motor M to detect rotation speeds of outer and inner rotors 103 and 102. More specifically, upon sensing respective angular positions of outer and inner rotors 103 and 102, a compound electric current that includes a current for driving outer rotor 103 and a current for driving inner rotor 102 is fed to the electromagnetic coil 117 to cause stator 101 to produce both a magnetic field for outer rotor 103 and another magnetic field for inner rotor 102. With this, outer rotor 103 and inner rotor 102 can be independently rotated relative to stator 101. The current for outer rotor 103 and that for inner rotor 102 can have different phases.

For clarifying the structure of stator 101 of the present invention, the basic construction of the same will be described again with reference to FIGS. 3 to 5.

As is understood from FIG. 5, the stator core of stator 101 comprises eighteen stator teeth SP that are circumferentially arranged around common axis O of motor M at evenly spaced intervals. Each stator tooth SP has a rectangular parallelepiped shape and includes a plurality of pressed out I-shaped flat magnetic steel plates that are closely aligned along common axis O intimately contacting to one another. Thus, the stator core has a waterwheel shape that has eighteen teeth (SP) that are circumferentially arranged about common axis O. Each stator tooth SP has a coil 117 that is put therearound making round-trips in a direction parallel with common axis O. The shape of coil 117 will be understood from FIGS. 9A and 9B.

In accordance with the present invention, the following features are further applied to stator core of the stator 101 for providing the stator core with a satisfied rigidity against a marked torque applied thereto.

Figure 6A:
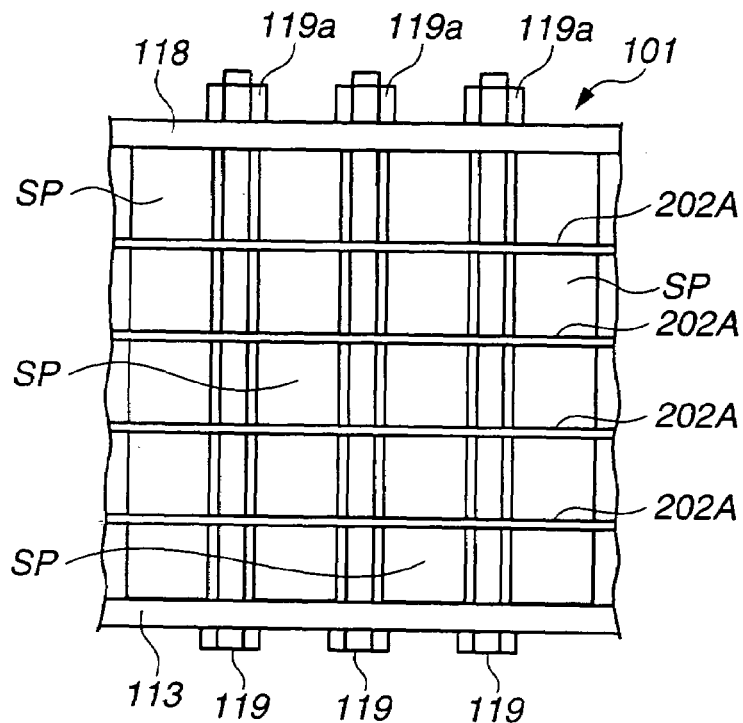
FIG. 6A is a schematically illustrated enlarged view of a part of the stator of the present invention.
Figure 7:
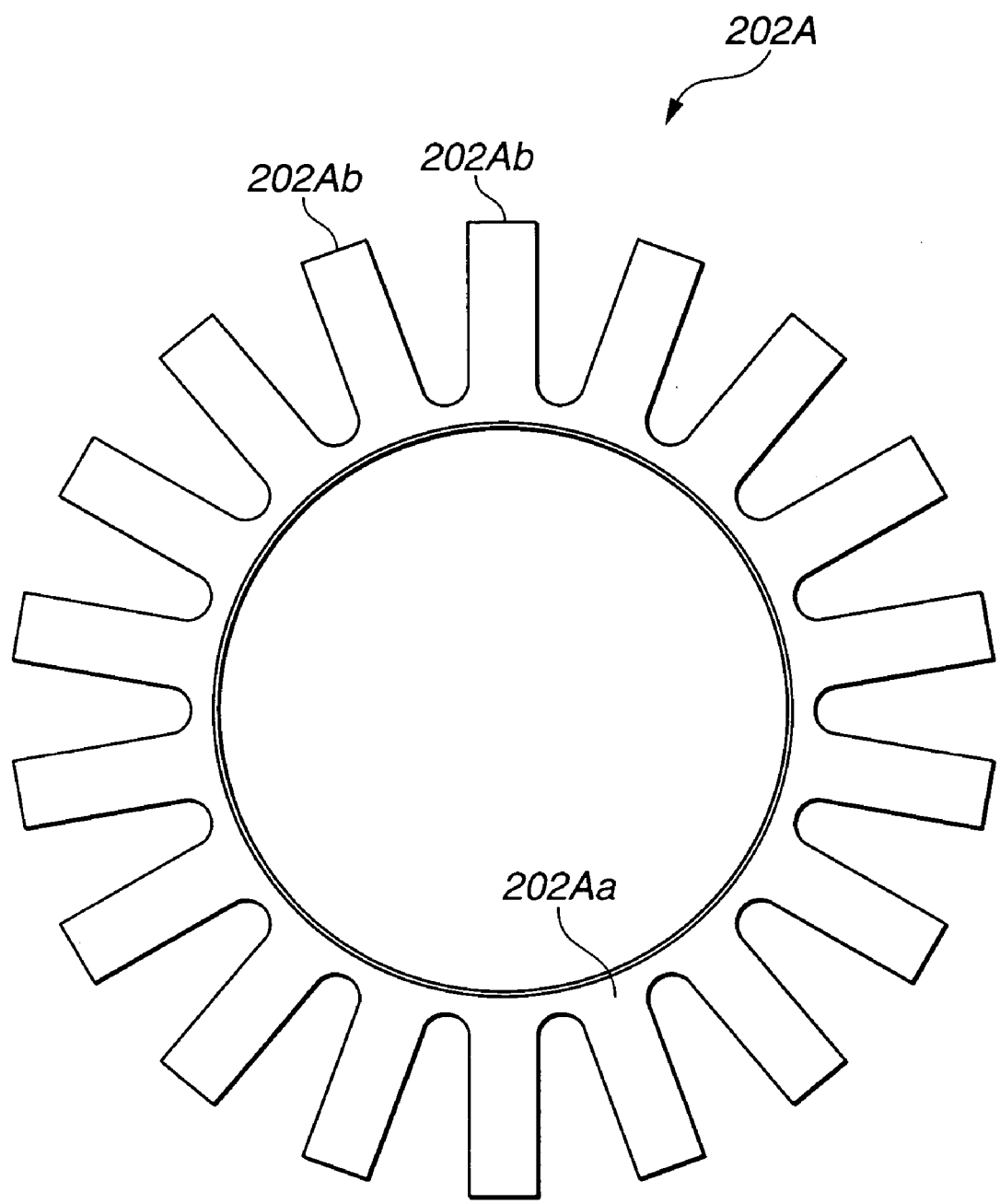
FIG. 7 is a plan view of a connecting ring plate employed in the stator of the present invention.

That is, as is seen from FIGS. 6A and 7, four axially spaced connecting ring plates 202A are coaxially installed in the stator core of stator 101. As is seen from FIG. 7, each connecting ring plate 202A comprises an annular inner base portion 202Aa and eighteen finger portions 202Ab that radially extend outward from annular inner base portion 202Aa.

Each connecting ring plate 202A is preferably made of a magnetic steel plate. In this case, the electromagnetic characteristic of stator 101 is increased. However, if desired, non-magnetic metal, such as aluminum, stainless steel or the like may be used for the connecting ring plate 202A. When ring plate 202A is installed in the stator core, each of the eighteen finger portions 202Ab of ring plate 202A is intimately put between two (viz., front and rear) of the pressed out flat magnetic steel sheets that constitute one of the stator teeth SP. Thus, when, before being applied with the plastic 120, nuts 119a are turned in a fastening direction, a unit including the eighteen stator teeth SP and the four ring plates 202A installed in the stator teeth SP are all fastened to one another between the supporting brackets 118 and 113. Of course, after the unit is assembled in the above-mentioned manner, a plastic molding is applied to the same, so that the stator core including the four ring plates 202A, two supporting brackets 113 and 118, bolts 119 and nuts 119a are all embedded in the molded plastic 120.

Figure 6B:
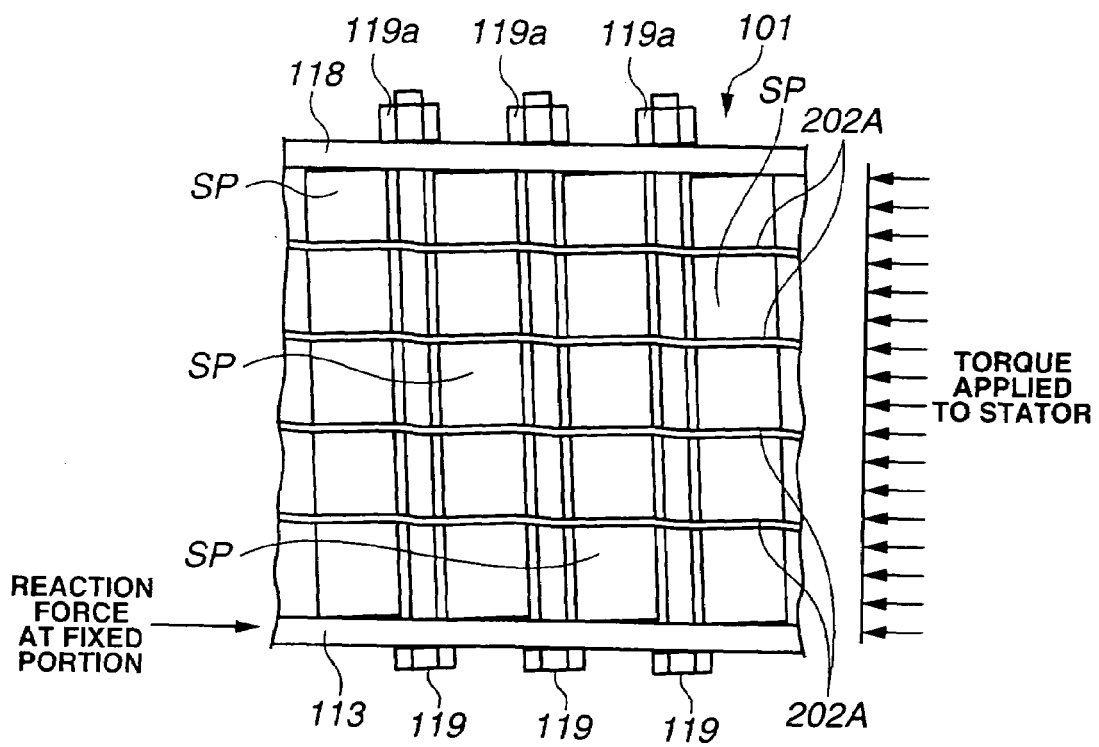
FIG. 6B is a view similar to FIG. 6A, but showing a condition wherein the stator is applied with a certain torque.

As is seen from FIG. 6B, under rotation of outer and inner rotors OR and IR, a certain torque is applied to stator 101 in a direction to induce a deformation or inclination of the stator teeth SP. However, provision of the four connecting ring plates 202A that are tightly installed in the stator teeth SP exhibits a high resistance against the deformation or inclination of stator teeth SP, as is understood from the drawing. That is, in the present invention, in addition to bolts 119 and nuts 119a, the four connecting ring plates 202A are used for tightly coupling the stator teeth SP. Thus, undesired deformation or inclination of stator teeth SP is suppressed or at least minimized.

It is to be noted that the above-mentioned advantageous phenomenon is achieved by only one connecting ring plate 202A.

Figure 8:
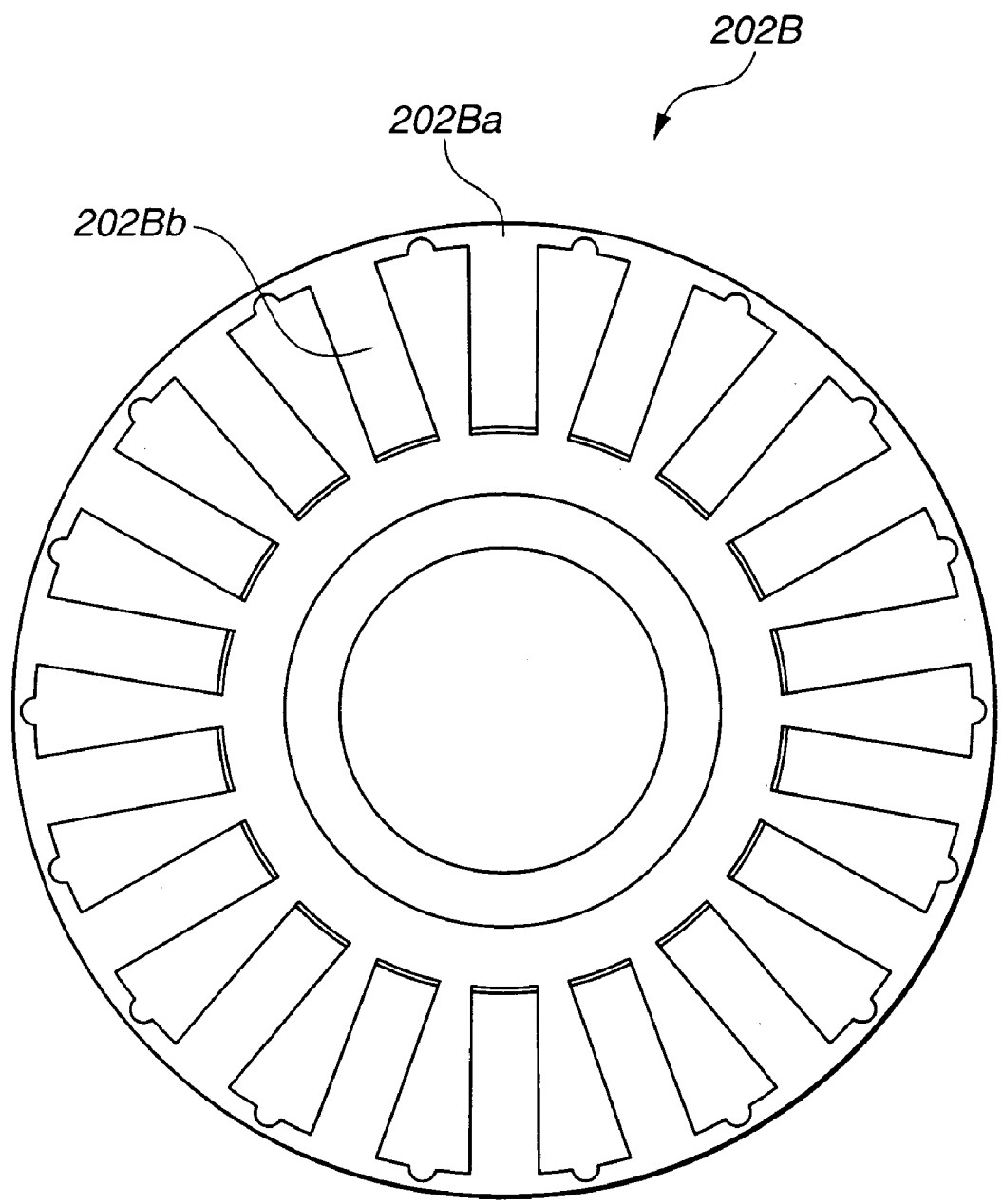
FIG. 8 is a plan view of another connecting ring plate that is employable in the stator of the present invention.
Figure 11A:
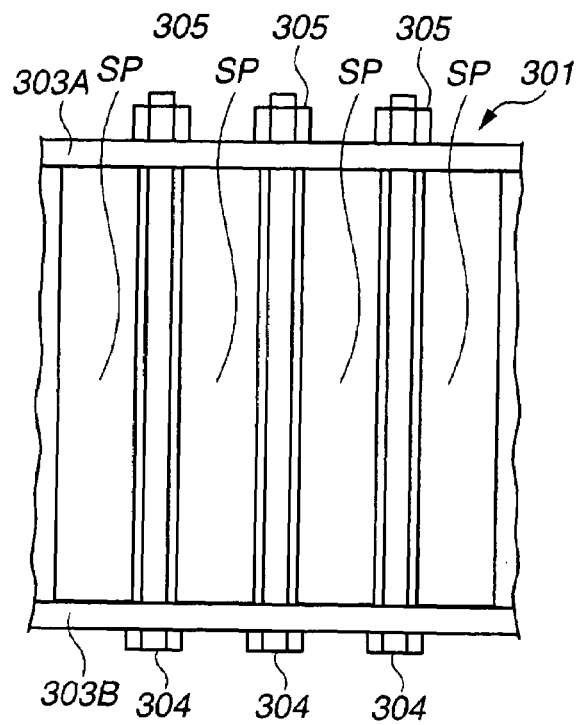
FIG. 11A is a schematically illustrated enlarged view of a part of a known stator.
Figure 11B:
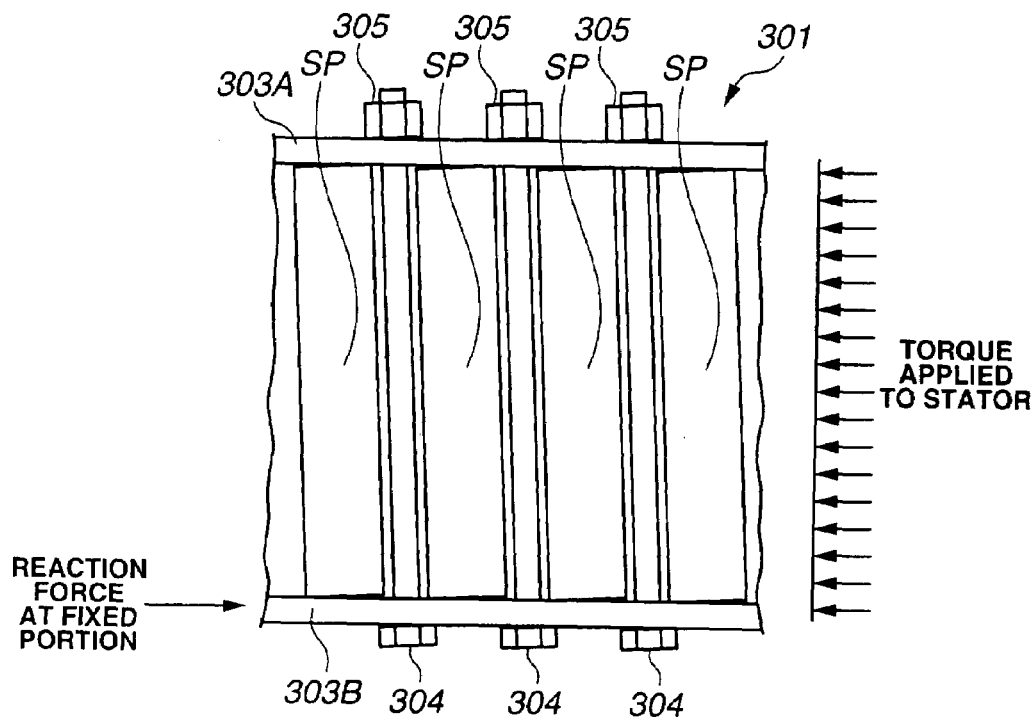
FIG. 11B is a view similar to FIG. 11A, but showing a condition wherein the stator is applied with a certain torque.

Referring to FIG. 8, there is shown another connecting ring plate 202B. Also in this case, at least one connecting ring plate 202B is used in the above-mentioned manner. As shown, the connecting ring plate 202B comprises an annular outer base portion 202Ba and eighteen finger portions 202Bb that radially extend inward from annular outer base portion 202Ba. For the above-mentioned same reasons, the stator core using the ring plates 202B can exhibit a high resistance against the deformation or inclination of the stator teeth SP.

It is to be noted that in both the stator 101 that includes connecting ring plates 202A of FIG. 7 and the stator 101 that includes connecting ring plates 202B of FIG. 8, fitting of coils 117 to the stator teeth SP can be easily achieved because the ring plates 202A and 202B have each one radial end open.

That is, as is seen from FIGS. 9A and 9B, each coil 117 is pre-shaped so as to have a rectangular opening that matches with the shape of the stator tooth SP, and when the stator teeth SP are properly assembled in the above-mentioned manner, each pre-shaped coil 117 is put on the corresponding stator tooth SP from the open side of the connecting ring plate 202A or 202B.

Referring to FIG. 10, there is shown another coil 117A which is also pre-shaped. In this case, each coil 117A is inserted axially over the corresponding stator tooth SP in the direction of the arrow "X", that is, in parallel with common axis O, and then open ends 117Aa of coil 117A are coupled to complete the coil 117A.

In the following, modifications of stator 101 of the present invention will be described.

As will be understood from FIG. 7 or 8, if each stator tooth SP including the connecting ring plates 202A or 202B has a radially leading end tapered, the work for putting the pre-shaped coil 117 (see FIGS. 9A and 9B) onto the corresponding stator tooth SP is much easily achieved.

Referring back to FIG. 5, another modification is shown. That is, in this modification, auxiliary stator members 223 (only one is shown) are circumferentially arranged at a cylindrical outer surface of the stator 101. As shown, each auxiliary stator member 223 comprises a non-magnetic metal base rod 221 embedded in the molded plastic zone and two magnetic metal rods 222 that are embedded in the molded plastic zone and connected to front and rear stator teeth SP. With these auxiliary stator members 223, the electromagnetic characteristic of the motor is much improved.

The entire contents of Japanese Patent Application 2003-101339 filed Apr. 4, 2003 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A stator for use in a two rotor single stator type electric motor in which inner and outer rotors are rotated independently with respect to each other within and around the stator upon application of current to the stator, the stator comprising:
    a stator core including a plurality of stator teeth that are independent with respect to one another and circumferentially arranged around a common axis, each stator tooth including a plurality of flat magnetic steel plates that are aligned along the common axis while contacting one another; and
    at least one connecting ring plate coaxially installed in the stator core in such a manner that the ring plate is put between adjacent two of the flat magnetic steel plates of each stator tooth while contacting both of the flat magnetic steel plates, the ring plate being of an endless annular member, wherein the connecting ring plate includes:
        an annular outer base portion; and
        a plurality of finger portions that radially extend inward from the annular outer base portion.

2. A stator as claimed in claim 1, in which the connecting ring plate is constructed of a magnetic steel plate.

3. A stator as claimed in claim 1, in which the connecting ring plate is constructed of a non-magnetic metal.

4. A stator as claimed in claim 1, further including at least two connecting ring plates, wherein at least some of the flat magnetic steel plates are held between the two connecting ring plates only by compression forces acting through the two connecting ring plates.

5. A stator as claimed in claim 1, wherein the at least one connecting ring plate coaxially installed in the stator core is installed in such a manner that the ring plate is put between adjacent two of the flat magnetic steel plates of each stator tooth while contacting both of the flat magnetic steel plates.

6. The stator of claim 1, wherein the stator does not include a yoke between the stator core and the outer rotor.

7. A vehicle drive system, comprising:
    a planetary gear unit including a first sun gear and a second sun gear; and
    the stator of claim 1, wherein the inner rotor is rotationally linked to the first sun gear, and the outer rotor is rotationally linked to the second sun gear.

8. A vehicle drive system, comprising:
    a planetary gear unit including a first sun gear and a second sun gear; and
    a stator for use in a two rotor single stator type electric motor in which inner and outer rotors are adapted to rotate independently with respect to each other within and around an axis of the stator upon application of electric power to the stator, the stator comprising:
        a stator core including a plurality of stator teeth that are circumferentially arranged around a common axis, each stator tooth including a plurality of flat magnetic steel plates that are aligned along the common axis while contacting one another;
        at least one connecting ring plate coaxially installed in the stator core in such a manner that the ring plate is put between adjacent two of the flat magnetic steel plates of each stator tooth, the ring plate being of an endless annular member and having a thickness that is smaller than an axial length of the stator;
    two bracket members between which the stator core, having therein the connecting ring plate, is sandwiched; and
    connecting members to fasten the sandwiched stator core within the two bracket members.
    wherein the inner rotor is rotationally linked to the first sun gear, and the outer rotor is rotationally linked to the second sun gear.

9. A vehicle drive system as claimed in claim 8, in which the connecting ring plate comprises:
    an annular inner base portion; and
    a plurality of finger portions that radially extend outward from the annular inner base portion.

10. A vehicle drive system as claimed in claim 8, in which each stator tooth has a rectangular cross section.

11. A vehicle drive system as claimed in claim 10, in which the rectangular cross section is tapered at its leading end.

12. A vehicle drive system as claimed in claim 8, in which each stator tooth is equipped at a radially leading end thereof with an auxiliary stator member that is constructed of a magnetic steel.

13. A vehicle drive system as claimed in claim 12, in which the auxiliary stator member of one stator tooth and the auxiliary stator member of an adjacent stator tooth are separated by a non-magnetic metal member that is arranged between the two stator teeth.

14. A vehicle drive system as claimed in claim 8, further including at least two connecting ring plates, wherein at least some of the flat magnetic steel plates are held between the two connecting ring plates only by compression forces acting through the two connecting ring plates.

15. A vehicle drive system as claimed in claim 8, wherein the plurality of stator teeth of the stator core are independent with respect to one another, and wherein the at least one connecting ring plate coaxially installed in the stator core is installed in such a manner that the ring plate is put between adjacent two of the flat magnetic steel plates of each stator tooth while contacting both of the flat magnetic steel plates.

16. A vehicle drive system as claimed in claim 8, wherein the stator does not include a yoke between the stator core and the outer rotor.

17. A vehicle drive system, comprising:
a planetary gear unit including a first sun gear and a second sun gear; and
a stator for use in a two rotor single stator type electric motor in which inner and outer rotors are rotated independently with respect to each other within and around the stator upon application of a compound electric current to the stator, the stator comprising:
a stator core including a plurality of stator teeth that are circumferentially arranged around a common axis, each stator tooth including a plurality of flat magnetic steel plates that are aligned along the common axis while contacting one another;
at least one connecting ring plate coaxially installed in the stator core in such a manner that the ring plate is put between adjacent two of the flat magnetic steel plates of each stator tooth, the ring plate being of an endless annular member and having a thickness that is smaller than an axial length of the stator;
a plurality of coils put around the stator teeth respectively;
two supporting brackets between which the stator teeth of the stator core, having therein the connecting ring plate, are sandwiched;
fastening members that fasten the two supporting brackets to tightly connect the magnetic steel plates of each stator tooth to one another, thereby fastening the sandwiched stator core within the two brackets; and
a molded plastic that embeds therein the stator core, the connecting ring plate, the coils, the two supporting brackets and the fastening members thereby to constitute a cylindrical structure,
wherein the inner rotor is rotationally linked to the first sun gear, and the outer rotor is rotationally linked to the second sun gear.

18. A stator as claimed in claim 17, wherein the stator does not include a yoke between the stator core and the outer rotor.

19. A vehicle drive system, comprising:
a planetary gear unit including a first sun gear and a second sun gear; and
a stator for use in a two rotor single stator type electric motor in which inner and outer rotors are rotated independently with respect to each other within and around the stator upon application of current to the stator, the stator comprising:
a stator core including a plurality of stator teeth that are independent with respect to one another and circumferentially arranged around a common axis, each stator tooth including a plurality of flat magnetic steel plates that are aligned along the common axis while contacting one another;
at least one connecting ring plate coaxially installed in the stator core in such a manner that the ring plate is put between adjacent two of the flat magnetic steel plates of each stator tooth while contacting both of the flat magnetic steel plates, the ring plate being of an endless annular member and having a thickness that is smaller than an axial length of the stator;
two bracket members between which the stator core, having therein the connecting ring plate, is sandwiched; and
connecting members to fasten the sandwiched stator core within the two bracket members,
wherein the at least one connecting ring plate is adapted to suppress deformation or inclination of the stator teeth, when a torque is applied to the stator, by contacting both of the flat magnetic steel plates, and
wherein the inner rotor is rotationally linked to the first sun gear, and the outer rotor is rotationally linked to the second sun gear.

20. A vehicle drive system as claimed in claim 19, further including at least two connecting ring plates, wherein at least some of the flat magnetic steel plates are held between the two connecting ring plates only by compression forces acting through the two connecting ring plates.

21. A stator as claimed in claim 19, wherein the stator does not include a yoke between the stator core and the outer rotor.

* * * * *